United States Patent
Fujikawa et al.

(10) Patent No.: US 12,177,628 B2
(45) Date of Patent: Dec. 24, 2024

(54) SPEAKER ARRANGEMENT STRUCTURE

(71) Applicant: HONDA MOTOR CO., LTD., Tokyo (JP)

(72) Inventors: Yuki Fujikawa, Tokyo (JP); Yuki Inamori, Wako (JP); Satoshi Fujiwara, Wako (JP); Yoshinobu Shimazu, Tokyo (JP); Arata Isobe, Tokyo (JP); Ayana Shibayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 17/892,519

(22) Filed: Aug. 22, 2022

(65) Prior Publication Data

US 2023/0059468 A1 Feb. 23, 2023

(30) Foreign Application Priority Data

Aug. 23, 2021 (JP) ................................. 2021-135269

(51) Int. Cl.
| | | |
|---|---|---|
| *H04R 1/34* | (2006.01) | |
| *B60Q 9/00* | (2006.01) | |
| *B60R 11/00* | (2006.01) | |
| *B60R 11/02* | (2006.01) | |
| *B60R 13/02* | (2006.01) | |
| *H04R 1/02* | (2006.01) | |

(52) U.S. Cl.
CPC ............... *H04R 1/345* (2013.01); *B60Q 9/00* (2013.01); *B60R 11/0217* (2013.01); *B60R 13/02* (2013.01); *H04R 1/025* (2013.01); *B60R 2011/0003* (2013.01); *B60R 2013/0287* (2013.01); *H04R 2499/13* (2013.01)

(58) Field of Classification Search
CPC .... H04R 1/345; H04R 1/025; H04R 2499/13; B60Q 9/00; B60R 11/0217; B60R 13/02; B60R 2011/0003; B60R 2013/0287
See application file for complete search history.

(56) References Cited

U.S. PATENT DOCUMENTS

| | | | | |
|---|---|---|---|---|
| 2004/0113401 A1* | 6/2004 | Ryu | ...................... | B60R 21/213 |
| | | | | 150/159 |
| 2007/0013200 A1* | 1/2007 | Totani | ................... | B60R 13/025 |
| | | | | 296/1.07 |
| 2014/0037115 A1* | 2/2014 | Vos | ........................ | H04R 19/04 |
| | | | | 381/174 |
| 2015/0078580 A1* | 3/2015 | Schwerdtfeger | ....... | H04R 1/323 |
| | | | | 381/86 |

(Continued)

FOREIGN PATENT DOCUMENTS

| | | | |
|---|---|---|---|
| JP | H07-24662 U | | 5/1995 |
| JP | 2007251409 A | * | 9/2007 |
| JP | 2016-124497 A | | 7/2016 |

*Primary Examiner* — Carolyn R Edwards
*Assistant Examiner* — Kuassi A Ganmavo
(74) *Attorney, Agent, or Firm* — Rankin, Hill & Clark LLP

(57) ABSTRACT

A speaker arrangement structure includes: a speaker device provided in an A-pillar (front pillar) of a vehicle and configured to turn and transmit sound, produced upward, toward a vehicle compartment; a curtain airbag extending in an up-down direction along an extending direction of the A-pillar and attached to the front pillar; and a bracket configured to attach a lower end of the curtain airbag to the front pillar. The speaker device is arranged below the bracket.

5 Claims, 4 Drawing Sheets

(56) References Cited

U.S. PATENT DOCUMENTS

| | | | |
|---|---|---|---|
| 2016/0068112 A1* | 3/2016 | Price | H04R 1/02 |
| | | | 381/86 |
| 2016/0368430 A1* | 12/2016 | Orellana | H04R 5/02 |
| 2018/0301135 A1* | 10/2018 | Yamabe | G06F 21/31 |
| 2019/0256010 A1* | 8/2019 | Baba | H04R 1/02 |
| 2022/0194303 A1* | 6/2022 | Fay | H04R 1/026 |

* cited by examiner

SPEAKER ARRANGEMENT STRUCTURE

CROSS-REFERENCE TO RELATED APPLICATION

The present application claims the benefit of priority to Japanese Patent Application No. 2021-135269 filed on Aug. 23, 2021, the disclosures of all of which are hereby incorporated by reference in their entireties.

TECHNICAL FIELD

Field of the Disclosure

The present disclosure relates to a speaker arrangement structure.

Related Art

Conventionally, there has been a speaker arrangement structure having speakers attached to front pillars (A-pillars) of a vehicle (see Japanese Patent Application Publication No. H07-24662U, for example, referred to as Patent Document 1 hereinbelow). The speaker arrangement structure includes the front pillars, each formed with a circular opening, to correspond to a planar shape of a speaker, on an interior wall surface of the front pillar, so that the speaker is fitted into the circular opening. With the speaker arrangement structure described above, the speakers are attached to the front pillars, to enhance sound effects in a vehicle compartment. Meanwhile, recently, there are vehicles (see Japanese Patent Application Publication No. 2016-124497A, for example) each provided with curtain airbags extending from front pillars over roof side rails.

SUMMARY OF THE DISCLOSURE

However, in the conventional speaker arrangement structure (see Patent Document 1, for example), there is an unavoidable problem, due to an inevitable shape of a speaker cone having a circular shape in plan view, of an insufficient space for arranging the curtain airbag in addition to the speaker in the front pillar. The present disclosure is intended to provide a speaker arrangement structure having a sufficient space for arranging a curtain airbag in addition to a speaker in a front pillar.

To solve the problem described above, a speaker arrangement structure of the present disclosure includes: a speaker device provided in a front pillar of a vehicle and configured to turn and transmit sound, produced upward, toward a vehicle compartment; a curtain airbag extending in an up-down direction along an extending direction of the front pillar and attached to the front pillar; and a bracket configured to attach a lower end of the curtain airbag to the front pillar, wherein the speaker device is arranged below the bracket.

According to the present disclosure, a speaker arrangement structure is provided to allow a front pillar to have sufficient space for arranging a curtain airbag in addition to a speaker.

DESCRIPTION OF THE EMBODIMENTS

Figure 1:
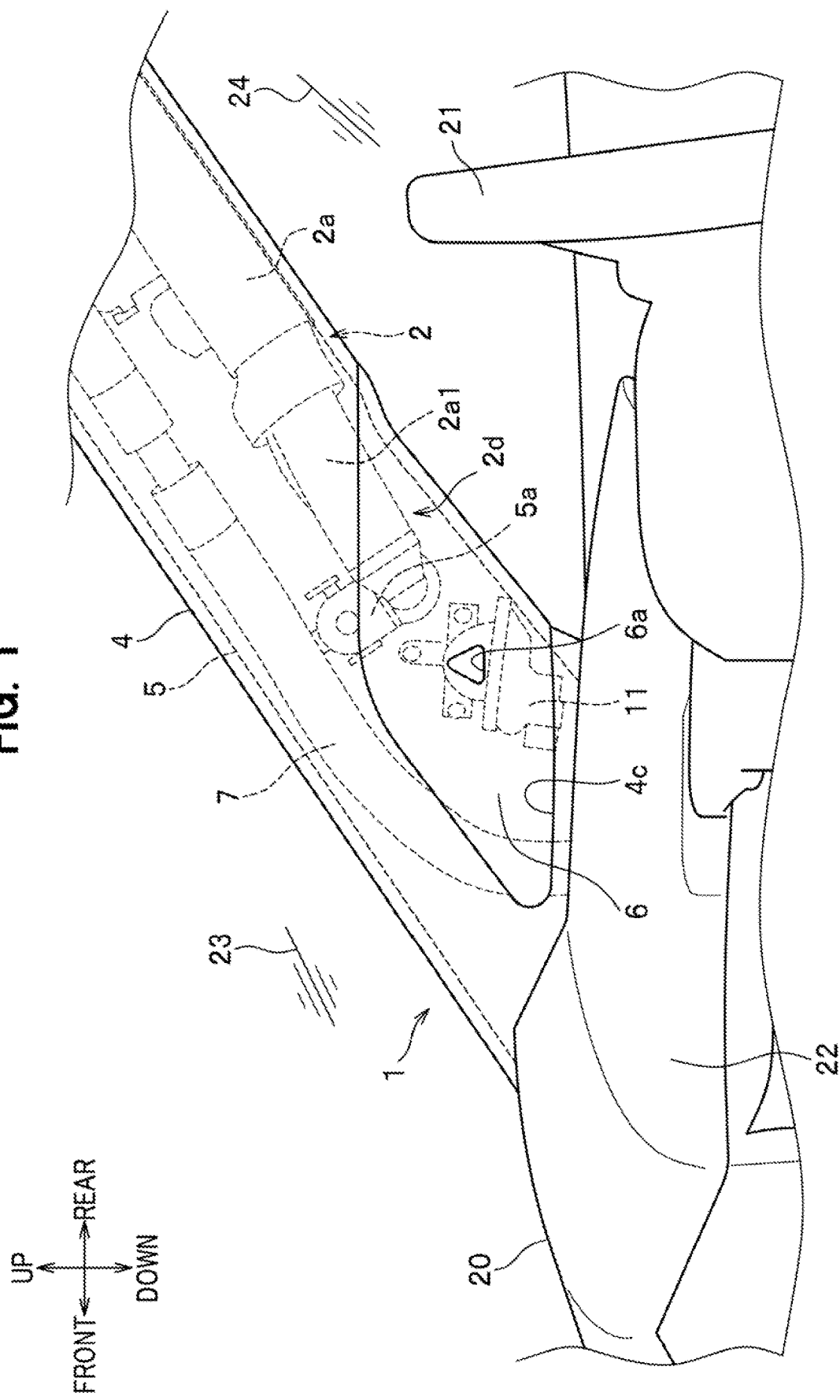
FIG. 1 is a partially enlarged perspective view of a front structure of a vehicle having a speaker arrangement structure according to an embodiment of the present disclosure, as viewed from a vehicle compartment.

Next, a description is given in detail of an embodiment for implementing a speaker arrangement structure of the present disclosure, with reference to the drawings as appropriate. The speaker arrangement structure according to the present embodiment is mainly characterized to have a speaker device arranged in an A-pillar (front pillar) of a vehicle and configured to turn and transmit sound, produced upward therefrom, toward a vehicle compartment, and arranged below a bracket at a lower end of a curtain airbag.

Hereinbelow, a speaker arrangement structure on a right side of bilaterally symmetrical speaker arrangement structures respectively provided in a pair of right and left A-pillars is described as an example, and the one on a left side is not described in detail. Note that, a front-rear direction, an up-down direction, and a right-left direction in the following description are based on directions indicated by arrows in the drawings and respectively corresponding to those of the vehicle.

FIG. 1 is a partially enlarged perspective view of a front structure of a vehicle 20 having a speaker arrangement structure 1 of the present embodiment, as viewed from the vehicle compartment. As shown in FIG. 1, the speaker arrangement structure 1 of the present embodiment includes an A-pillar 5 (front pillar), a curtain airbag 2, a speaker device 11, and a harness 7. Note that, in FIG. 1, a pillar garnish 4 (simply referred to as the garnish 4 hereinbelow), to be arranged on an interior side of the A-pillar 5, is indicated by a solid line, and the A-pillar 5 is indicated by a hidden line (dotted line). Further, the curtain airbag 2, the speaker device 11, and the harness 7 arranged in a space between the A-pillar 5 and the garnish 4 are also indicated by hidden lines (dotted lines).

<<Front Structure of Vehicle>>

Prior to a description of the speaker arrangement structure 1 of the present embodiment, a description is given of the front structure of the vehicle 20 in which the speaker arrangement structure 1 is mounted. As shown in FIG. 1, a front part of the vehicle 20 includes a steering wheel 21 arranged to correspond to a seated driver, a windshield 23 arranged above an instrument panel 22 to face the driver, and a side door glass 24 provided on a side of the driver. The A-pillar 5 is arranged between the windshield 23 and the side door glass 24 so as to extend in an up-down direction.

<<A-Pillar>>

Though not shown, the A-pillar 5 is a vehicle body frame member having a lower end thereof connected to a front end of a side sill, extending in a front-rear direction at a lower portion of a side of the vehicle body, and extending upward from the lower end. As shown in FIG. 1, the A-pillar is inclined so as to be displaced rearward as extending upward between the windshield 23 and the side door glass 24. Though not shown, an upper end of the A-pillar 5 as described above is connected to a front end of a roof side rail extending in the front-rear direction at an outer side in a vehicle width direction of a roof of the vehicle 20. Incidentally, the A-pillar 5 has a closed cross-sectional structure formed by an outer pillar (not shown) and an inner pillar (not shown) joined to each other, both being formed of a steel plate material.

As shown in FIG. 1, the garnish 4 is arranged to cover an interior side (near side in a plane of paper in FIG. 1) of the A-pillar 5. The garnish 4 in the present embodiment is assumed to be formed of a resin plate, which is wider than the A-pillar 5, in a side view as viewed from the vehicle compartment. The garnish 4 in the present embodiment has a substantially L-shape in cross-section, taken along a longitudinal direction thereof. The garnish 4 is arranged such that a concave surface thereof faces the A-pillar 5, to define a space with the A-pillar 5.

Further, though not shown, the garnish 4 has a pillar attachment part formed to partially protrude from the concave surface toward the A-pillar 5. The garnish 4 is supported by the A-pillar 5 with clipping or the like via the pillar attachment part so as to be detached when the curtain airbag 2 described below is inflated and deployed. As shown in FIG. 1, the garnish 4 as described above has a decorative member 6 at a portion corresponding to the speaker device 11. The decorative member 6 is described below in detail, together with the speaker device 11.

<<Curtain Airbag>>

Next, a description is given of the curtain airbag 2 (see FIG. 1). The curtain airbag 2 is configured to have a bag body 2a thereof inflated and deployed in a curtain shape at a side in a vehicle compartment with gas supplied from an inflator (not shown) when a predetermined condition is satisfied at a time of collision of the vehicle 20 (see FIG. 1).

As shown in FIG. 1, the bag body 2a of the curtain airbag 2, folded and ready for inflation and deployment, extends in the up-down direction along an extending direction of the A-pillar 5, and is attached to the A-pillar 5. Further, though not shown, the curtain airbag 2 extends in the front-rear direction along an extending direction of the roof side rail so as to be continuous to the A-pillar 5, and is attached to the roof side rail. That is, the curtain airbag 2 is provided continuously from the A-pillar 5 over the roof side rail.

Figure 2:
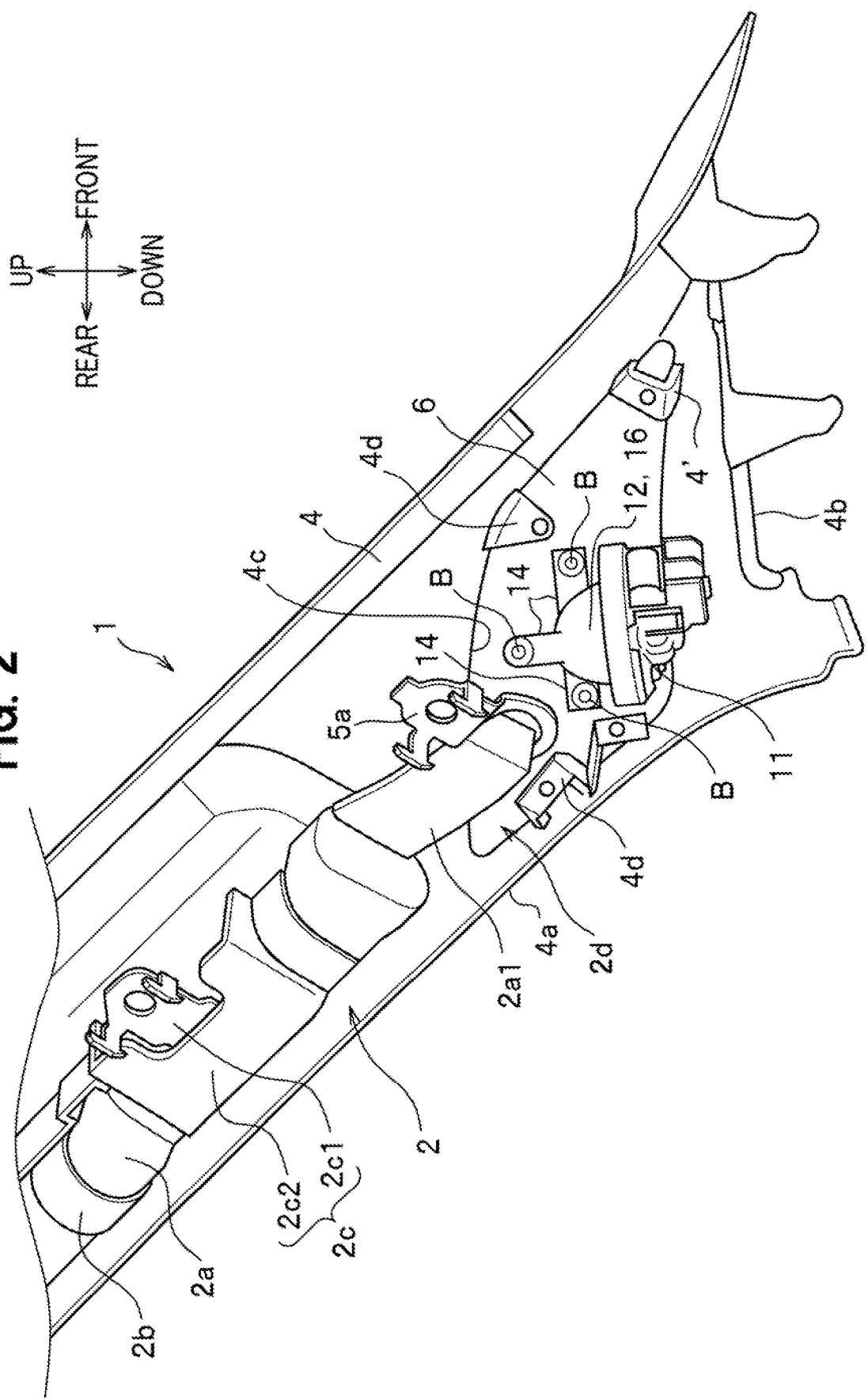
FIG. 2 is a partially enlarged perspective view of the speaker arrangement structure shown in FIG. 1, excluding an A-pillar (front pillar), as viewed from outside the vehicle.

FIG. 2 is a partially enlarged perspective view of the speaker arrangement structure 1 shown in FIG. 1, excluding the A-pillar 5 (see FIG. 1), as viewed from outside the vehicle. As shown in FIG. 2, the bag body 2a of the curtain airbag 2 is kept folded in an elongated shape by binding bands 2b which can be broken when the curtain airbag 2 is inflated. The binding bands 2b are arranged at two or more positions along a longitudinal direction of the bag body 2a.

Further, as shown in FIG. 2, the curtain airbag 2 has fixing members 2c for fixing the folded bag body 2a to the A-pillar 5 (see FIG. 1). The fixing members 2c are arranged at two or more positions along the longitudinal direction of the bag body 2a. The fixing member 2c includes a fastened part 2c1 fastened to the A-pillar 5 (see FIG. 1) with a bolt or the like, and a support part 2c2 for supporting the bag body 2a. Still further, the curtain airbag 2 has a lower end 2d, or a strap 2a1 extending from the bag body 2a, fixed to the A-pillar (see FIG. 1) via a bracket 5a. The bracket 5a corresponds to a "bracket" in the appended claims.

<<Speaker Device>>

Next, a description is given of the speaker device 11 (see FIG. 1). The speaker device 11 in the present embodiment is assumed to include a tweeter as a speaker for a high frequency range. As shown in FIG. 1, the speaker device 11 is arranged below the bracket 5a for attaching the lower end 2d of the curtain airbag 2 to the A-pillar 5. Specifically, as shown in FIG. 2, the speaker device 11 is fixed to a back side (far side from the vehicle compartment) of the decorative member 6 with bolts B via three ribs 14 extending from a case 12 (sound reflecting part 16) described below. As described below, the speaker device 11 is attached to the garnish 4 via the decorative member 6, so as to be attached to a lower side and a rear side of the garnish 4. That is, as shown in FIG. 2, the speaker device 11 is arranged at a corner between a rear edge 4a and a lower edge 4b of the garnish 4.

Figure 3:
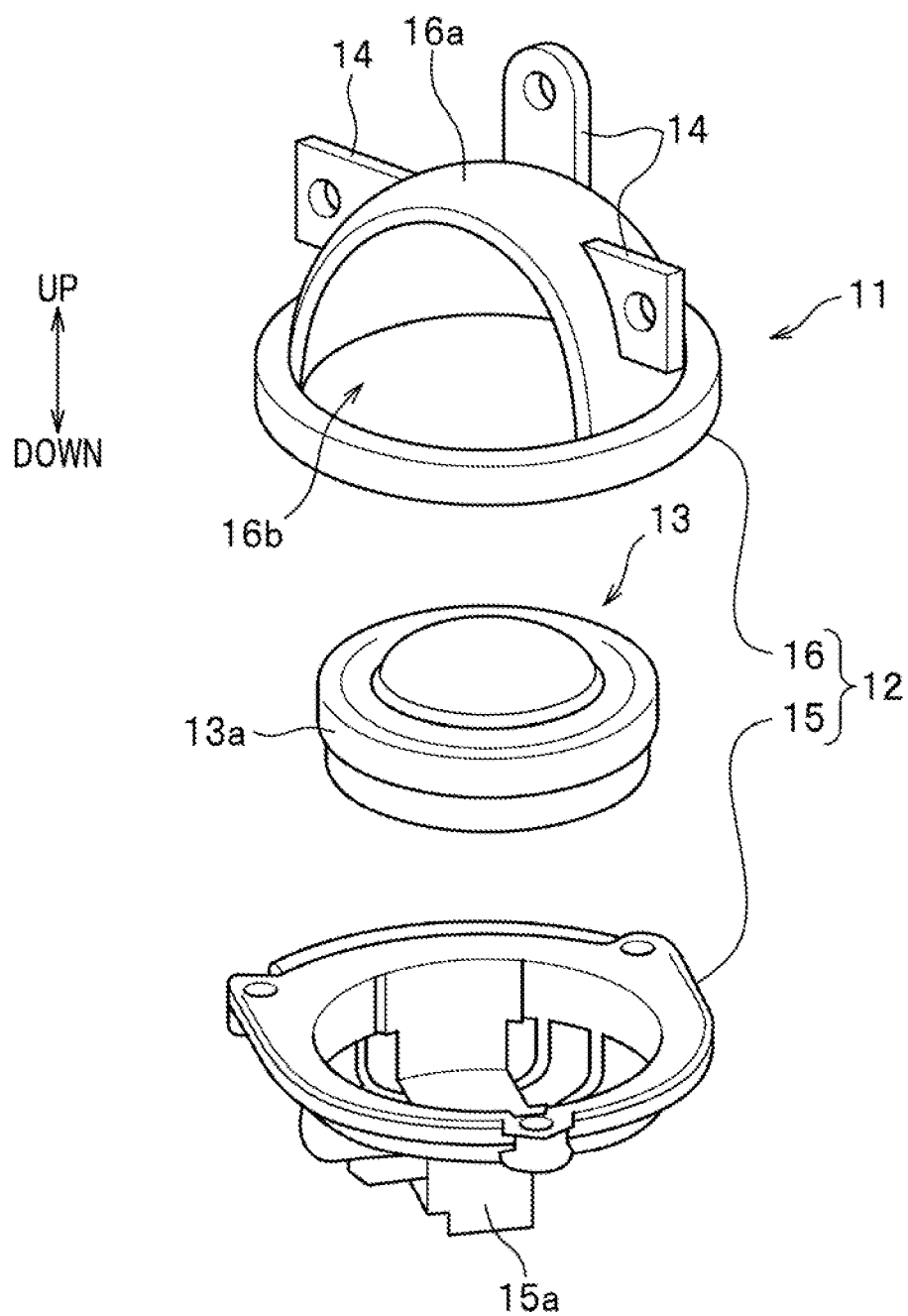
FIG. 3 is an exploded perspective view of a speaker device forming the speaker arrangement structure according to the embodiment of the present disclosure.
Figure 4:
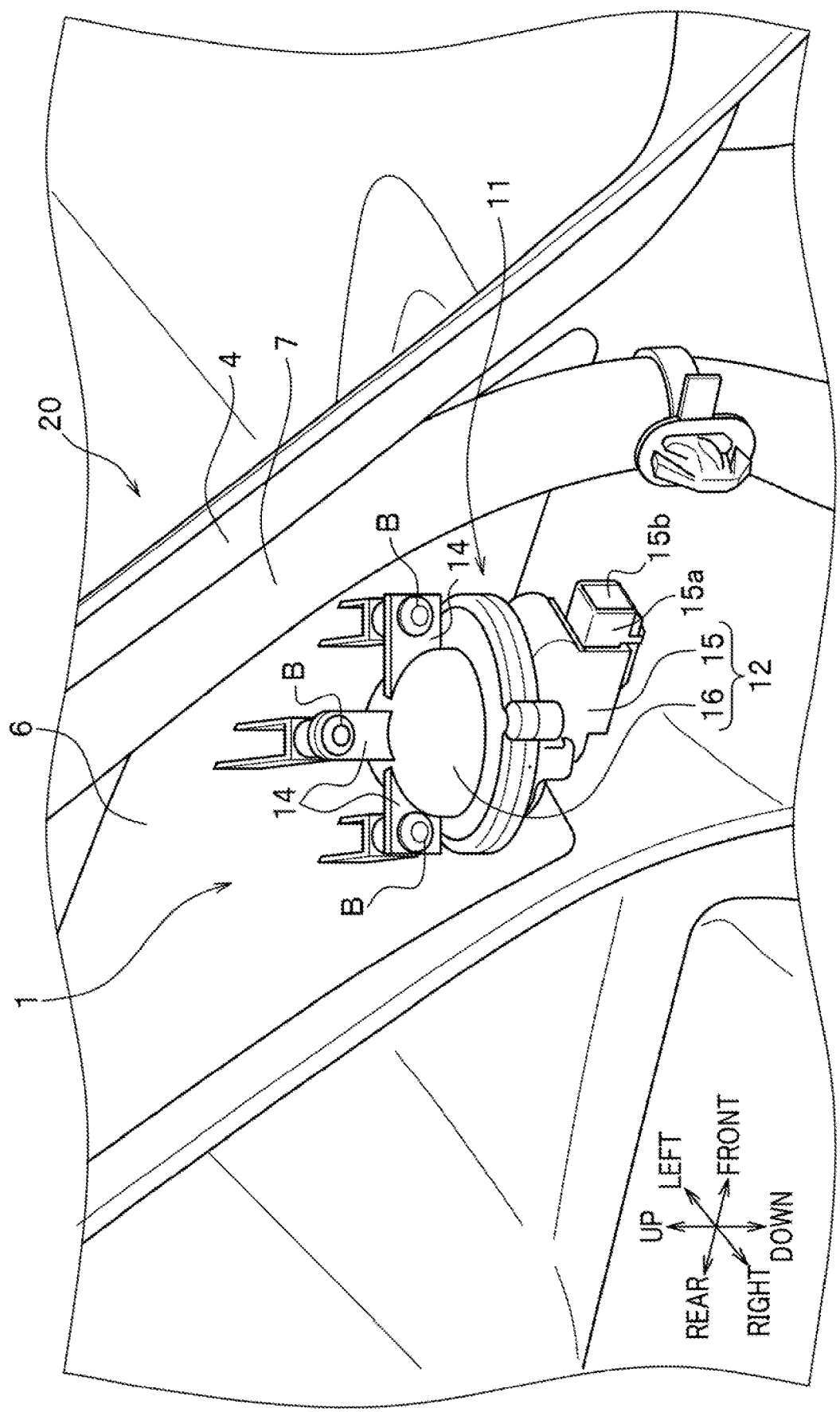
FIG. 4 is an entire perspective view of the speaker device attached to a garnish.

FIG. 3 is an exploded perspective view of the speaker device 11. FIG. 4 is an entire perspective view of the speaker device 11 attached to the garnish 4 via the decorative member 6. As shown in FIG. 3, the speaker device 11 mainly includes the case 12 and a tweeter 13 (speaker) accommodated in the case 12. The case 12 includes a base member 15 forming a lower half body and the sound reflecting part 16 forming an upper half body. The case 12 is formed by the base member 15 and the sound reflecting part 16 fastened with bolts (not shown) or the like to each other as a unit. This forms an accommodation space for the tweeter 13 in the case 12.

The base member 15 includes, at a lower portion thereof, a connector 15a. Further, the base member 15 is provided, inside (side closer to the tweeter 13) thereof, with a terminal (not shown) electrically connected to the tweeter 13 accommodated in the case 12 and to the connector 15a. Incidentally, the connector 15a is attached to a harness (not shown) electrically connected to the tweeter 13. As shown in FIG. 4, an opening 15b of the connector 15a, to which the harness is attached, faces forward in a front-rear direction of the vehicle 20.

Referring back to FIG. 3, the tweeter 13 includes a diaphragm (not shown) in a dome shape, protruding upward, provided in a housing 13a in a flat cylindrical outer shape, having a sound opening (not shown) on an upper surface of the housing 13a. The tweeter 13 includes, though not shown, a magnetic field generating member formed of a yoke, a magnet, and the like arranged in the housing 13a, and a voice coil wound around a bobbin on a back surface of the diaphragm, to vibrate the diaphragm. Thus, the tweeter 13 serves as a sound producing source to produce sound upward through the sound opening.

The sound reflecting part 16 is configured to reflect the sound produced upward by the tweeter 13 so as to turn and transmit the sound toward the vehicle compartment. Specifically, the sound reflecting part 16 turns the sound from the tweeter 13 toward the vehicle compartment through a through hole 6a (see FIG. 1) formed in the decorative member 6 (see FIG. 1).

As shown in FIG. 3, the sound reflecting part 16 of the present embodiment has a reflecting wall 16a in a dome shape having a curved concave surface inside thereof, and a sound opening 16b formed with a side of the reflecting wall 16a partially cut off. The reflecting wall 16a has the curved concave surface inside thereof, to reflect the sound from the tweeter 13 so as to be emitted outward through the sound opening 16b. Meanwhile, as shown in FIG. 4, in the speaker device 11, the sound reflecting part 16 is fixed to the decorative member 6 via the ribs 14, so that the sound opening 16b of the sound reflecting part 16 shown in FIG. 3 is arranged to correspond to the through hole 6a of the decorative member 6 shown in FIG. 1.

Thus, the sound reflecting part 16 serves as a support part of the speaker device 11 to the decorative member 6, and also serves as a sound-guide for guiding and transmitting the sound produced by the tweeter 13 provided below the through hole 6a through the through hole 6a (see FIG. 1) toward the vehicle compartment. Note that the reflecting wall 16a is not limited to one having a dome shape as long as the sound from the tweeter 13 is reflected and transmitted toward the through hole 6a (see FIG. 1) of the decorative member 6 (see FIG. 1), and may have an inclined surface which inclines downward from the sound reflecting part 16 toward the decorative member 6 (see FIG. 1).

Next, a description is given in more detail of the decorative member 6 (see FIG. 1). The decorative member 6 in the present embodiment is assumed to be formed of a resin plate. The decorative member 6 is intended to improve decoration of the garnish 4, which faces the vehicle compartment. As shown in FIG. 1, the decorative member 6 is arranged at a lower end of the garnish 4. The bracket 5a is arranged to overlap the decorative member 6 at an outer side in the vehicle width direction (far side in the plane of paper in FIG. 1) of the decorative member 6.

The decorative member 6 as described above is fitted in a cutoff part 4c formed in the garnish 4 so as to correspond to a planar shape thereof. Incidentally, the decorative member 6 in the present embodiment has a planar shape of a substantially parallelogram, but is not limited thereto. As shown in FIG. 2, the decorative member 6 is detachably locked to a locking part 4d provided in the vicinity of the cutoff part 4c of the garnish 4 by clipping or the like.

Further, the decorative member 6 in the present embodiment, as described above, serves as not only a mounting member for the speaker device 11 to the garnish 4 but also an acoustic lens for the speaker device 11. That is, the decorative member 6 shown in FIG. 1 has a structure of a concave lens which refracts high-frequency sound emitted through the through hole 6a toward the vehicle compartment so as to diffuse the sound toward one or more passengers.

<<Harness>>

Next, a description is given of the harness 7 (see FIG. 1). The harness 7 is a line-shaped member to mainly supply electric power from a power source to electrical components. Incidentally, the harness 7 in the present embodiment is, though not shown, assumed to include lines wired from the power source to the roof so as to be connected to a room lamp, a sunroof unit, and the like, and various signal lines, but is not limited thereto.

As shown in FIG. 1, the harness 7 extends in the up-down direction along the extending direction of the A-pillar 5. Specifically, the harness 7 is arranged at an inner side in the vehicle width direction of the A-pillar 5, to extend in the up-down direction along a front edge of the A-pillar 5. Accordingly, the curtain airbag 2 and the speaker device 11 are arranged behind the harness 7. The harness 7 as described above is attached to the A-pillar 5 by clipping or the like at two or more positions along a longitudinal direction thereof.

Advantageous Effects

Next, a description is given of advantageous effects of the speaker arrangement structure 1 according to the present embodiment. A conventional speaker arrangement structure (refer to Patent Document 1, for example) employs a so-called vertical speaker arrangement structure, in which the speaker is arranged to face the vehicle compartment. In such a conventional speaker arrangement structure, a radial length of a speaker cone directly affects a height of the speaker arrangement structure in the A-pillar. Therefore, in the conventional speaker arrangement structure, if a curtain airbag is attempted to be further arranged in the A-pillar, there arises an unavoidable problem, due to an inevitable shape of the speaker cone, of an insufficient space in the up-down direction of the A-pillar for arranging the curtain airbag.

In contrast, the speaker arrangement structure 1 of the present embodiment employs a horizontal speaker arrangement structure, in which the speaker device 11 produces sound upward. Further, the speaker device 11 of the speaker arrangement structure 1 of the present embodiment is arranged below the bracket 5a for attaching the lower end of the curtain airbag 2 to the A-pillar 5.

According to the speaker arrangement structure 1 as described above, the speaker device 11 is placed horizontally, different from the conventional one, so that the height of the speaker arrangement structure 1 in the A-pillar 5 is reduced. Further, according to the speaker arrangement structure 1 as described above, the speaker device 11 is arranged below the bracket 5a, allowing for further extending the curtain airbag 2 along the extending direction of the A-pillar 5. The speaker arrangement structure 1 has a sufficient space for arranging the curtain airbag 2 in the A-pillar 5.

Further, the speaker device 11 of the speaker arrangement structure 1 is attached to the lower side and rear side of the garnish 4, and the opening 15b of the connector 15a faces forward. According to the speaker arrangement structure 1 as described above, the harness (not shown) is easily connected to the opening 15b of the connector 15a.

Further, in the speaker arrangement structure 1, the bracket 5a, which attaches the lower end 2d of the curtain airbag 2 to the A-pillar 5, is arranged to overlap the decorative member 6 to which the speaker device 11 is attached, at the outer side in the vehicle width direction of the decorative member 6. According to the speaker arrangement structure 1 as described above, the lower end 2d of the curtain airbag 2 is further extendable to a portion in vicinity to the speaker device 11. The speaker arrangement structure 1 has more reliably a sufficient space for arranging the curtain airbag 2 in the A-pillar 5.

Further, in the speaker arrangement structure 1, the curtain airbag 2 and the speaker device 11 are both arranged behind the harness 7. According to the speaker arrangement structure 1 as described above, the space defined between the A-pillar 5 and the garnish 4 is more effectively used.

Further, in the speaker arrangement structure 1, the tweeter 13 (speaker) is arranged below the through hole 6a of the decorative member 6. According to the speaker arrangement structure 1 as described above, the height of the speaker arrangement structure 1 in the A-pillar 5 is reduced more reliably. Thus, the speaker arrangement structure 1 has more reliably a sufficient space for various components in the A-pillar 5. The present embodiment has been described above, but the present disclosure is not limited thereto and can be implemented in various forms.

What is claimed is:

1. A speaker arrangement structure comprising:
  a speaker device provided in a front pillar of a vehicle and configured to turn and transmit sound, produced upward, toward a vehicle compartment;
  a curtain airbag extending in an up-down direction along an extending direction of the front pillar and attached to the front pillar;
  a bracket configured to attach a lower end of the curtain airbag to the front pillar;
  a garnish covering an interior side of the front pillar; and
  a decorative member configured to attach the speaker device to the garnish,
  wherein the decorative member has a through hole through which sound produced by the speaker device is transmitted toward the vehicle compartment, the speaker device is arranged below the bracket and has a sound reflecting part configured to reflect the sound produced upward so as to turn and transmit the sound toward the vehicle compartment, the sound reflecting part has a reflecting wall which inclines downward toward the decorative member and a sound opening formed with a side of the reflecting wall partially cut off, and the sound opening of the sound reflecting part is arranged to correspond to the through hole of the decorative member.

2. The speaker arrangement structure according to claim 1, wherein the speaker device is attached to a lower side and a rear side of the garnish; and an opening of a connector of the speaker device faces forward in a front-rear direction of the vehicle.

3. The speaker arrangement structure according to claim 2, wherein the bracket is arranged to overlap the decorative member at an outer side in a vehicle width direction of the decorative member.

4. The speaker arrangement structure according to claim 1, further comprising a harness extending in the up-down direction along the extending direction of the front pillar, wherein the curtain airbag and the speaker device are both arranged behind the harness.

5. The speaker arrangement structure according to claim 1, wherein a speaker as a sound producing source of the speaker device is arranged below the through hole.

* * * * *